US006655920B2

United States Patent
Beutin et al.

(10) Patent No.: US 6,655,920 B2
(45) Date of Patent: Dec. 2, 2003

(54) TURBOMACHINE ROTOR ASSEMBLY WITH TWO BLADED-DISCS SEPARATED BY A SPACER

(75) Inventors: Bruno Beutin, Corbeil-Essonnes (FR); Michel Brault, Boussy Saint-Antoine (FR); Pascal Gervais, Boissise la Bertrand (FR); Elisabeth Guigli, Saint Vrain (FR); Monique Thore, Crosne (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/159,126

(22) Filed: Jun. 3, 2002

(65) Prior Publication Data

US 2002/0187046 A1 Dec. 12, 2002

(30) Foreign Application Priority Data

Jun. 7, 2001 (FR) .............................. 01 07413

(51) Int. Cl.$^7$ ................................................ F01D 11/00
(52) U.S. Cl. .................... 416/198 A; 415/199.5
(58) Field of Search .............................. 415/115, 199.5; 416/198 R, 198 A, 95

(56) References Cited

U.S. PATENT DOCUMENTS

| 4,277,225 A | | 7/1981 | Dubois et al. |
| 4,730,982 A | | 3/1988 | Kervistin |
| 4,869,640 A | | 9/1989 | Schwarz et al. |
| 5,232,339 A | * | 8/1993 | Plemmons et al. .......... 415/178 |
| 5,236,302 A | * | 8/1993 | Weisgerber et al. ..... 415/173.7 |
| 5,833,244 A | | 11/1998 | Salt et al. |

FOREIGN PATENT DOCUMENTS

| EP | 1 013 886 | 6/2000 |
| EP | 1 079 070 | 2/2001 |
| GB | 2 280 478 | 2/1995 |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

A spacer (36) made to be installed between two permanently connected discs (31 and 32), without a bolted flange, and comprising axial thrust (43, 47) as well as outer radial thrust (45, 48) alignment surfaces (41). It comprises moreover an outer cover (37) to provide sealing and a cooling passageway, and stiffening tongues (38) which accommodate thrust loads.

8 Claims, 4 Drawing Sheets

TURBOMACHINE ROTOR ASSEMBLY WITH TWO BLADED-DISCS SEPARATED BY A SPACER

Figure 1:
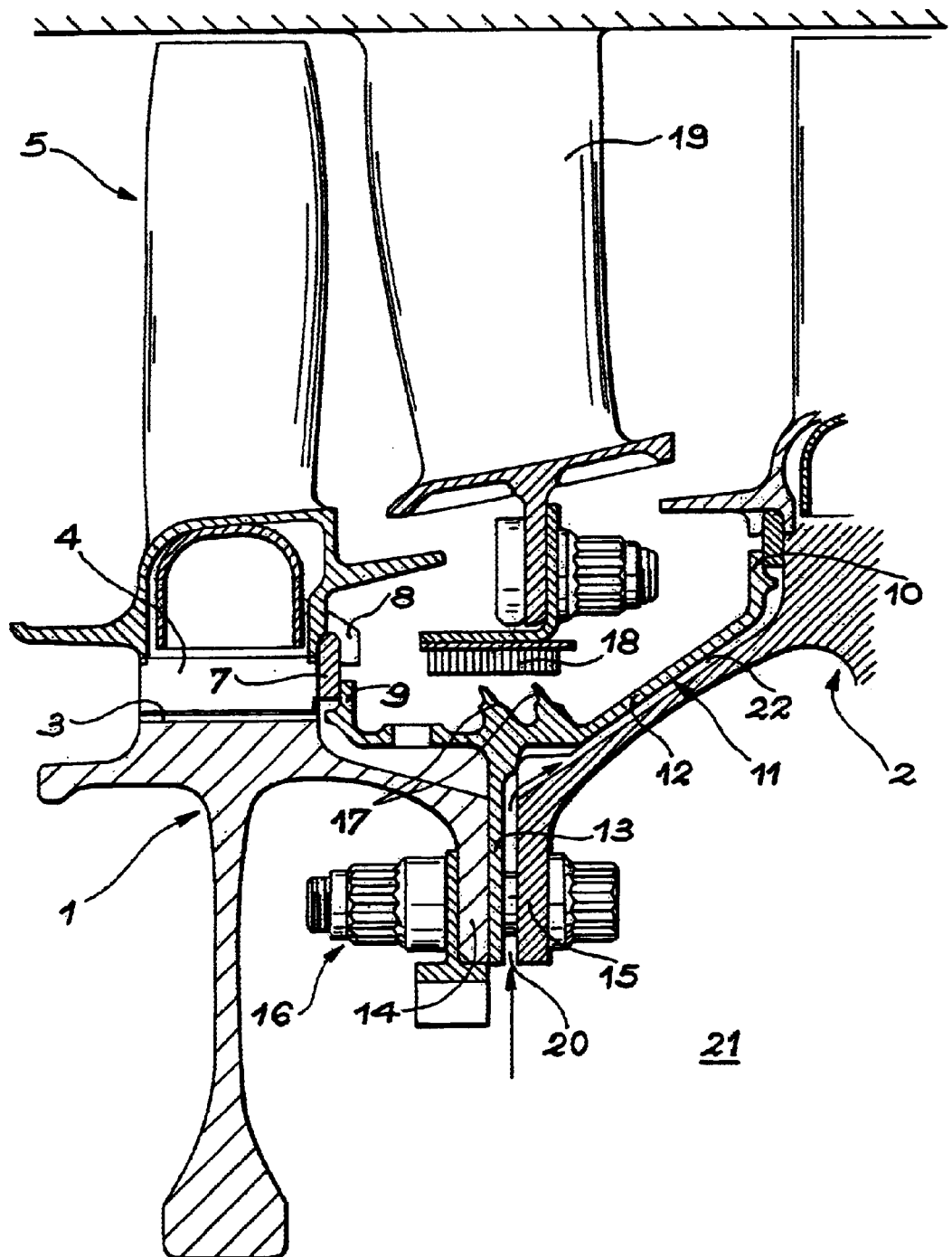

This invention relates to the assembly of a turbomachine rotor, comprising in particular two bladed-discs separated by a spacer used for cooling or sealing.

A classical construction of rotors comprises successive discs equipped with flanges that are in contact with each other and connected using a bolting system. There are circular spacers around the flanges. Cooling air for the discs can flow inside these spacers and their outer surfaces may carry arrangements to ensure a seal with the fixed blades of the stator. The U.S. Pat. No. 4,730,982-A is such an example. The spacers are normally bolted to the flanges, but this design is not feasible if the discs are designed to be fabricated from a single blank, or welded, which dispenses with the flanges.

The invention relates to a new assembly arrangement of rotors comprising two consecutive discs and an intermediate spacer, that is adapted to the permanently connected discs where the bolted flanges have been dispensed with, which requires the design of a different system for the attachment of the spacer.

One solution has already been suggested in the document U.S. Pat. No. 4,277,225-A. The spacers are equipped with pins mounting with the cross section being similar to that of the blade roots and which slot into the serrations of the blade roots. Axial locking of several stages of blades is achieved by compressing the stack of spacers and blades, with the pins mounting of the spacers butting up against the ends of the blade roots.

This design is not described here. It is not clear that the compression of a complex stack would be satisfactory in the presence of vibrations, and very precise manufacturing of the components is necessary in order to achieve a correct assembly, especially such that the pins mounting of the spacers are accurately adjusted with the discs located at either end. These pins mounting have a very complicated cross section. It is also necessary for the discs to be the same, and that the rotor is thus cylindrical. Finally, the inventor has ignored the continuity of the spacers in an angular direction, each one having only one pin mounting on each side. The neighbouring spacers are in contact through the inner lands of the ribs which cover the front of the discs, in which have to be formed additional serrations just to allow the ribs to pass.

In the most general definition of the invention, the spacer comprises a cover surrounding one of the discs (in which are formed location serrations for the blade roots), tongues that can slide into the serrations, the inner radial thrust faces on the matching faces formed in one of the discs, and the outer axial thrust faces, the inner radial thrust faces being located on the tongues. Furthermore the invention is original in that the outer axial thrust faces comprise the primary faces that press against one of the discs, and the secondary faces opposite the primary faces, that press on a seal associated with the other discs.

Later on it will be shown how this spacer meets the requirements of a rigid assembly despite the absence of bolting and without compromising the sealing functions, and even improving the potential for disc cooling. Another essential benefit that is achieved is the simplification of assembly, together with a weight reduction and possibly better strength, due to the connection of the discs, the disposal of bolts and an improved trueness of the shape of the separate units.

It is to be noted that the tongues, though analogous to the ribs that join the spacers as sections of a circle in the document U.S. Pat. No. 4,277,225-A, have other functions and are not located in the same way, since above all they are used to take the radial thrust of the spacer on the disc. They must be capable of sliding in the serrations of the discs, but in reality they are not located there when the build is completed. In the absence of a method equivalent to the pins mounting, that take the thrust loads in the disc serrations to locate the spacers, the latter are located entirely between the discs. They are continuous around a circle, which allows them to be held in place by a single collar located on the side of one of the discs.

In a beneficial embodiment, the previous design is improved whereby the tongues and the cover form the boundary for the cooling passages of the discs, the passages also extending into the serrations and under the roots of the blades, and such that the tongues extend between the serrations, the first outer axial thrust faces being on the tongues, and the complementary faces being located on a crown formed on the side of the first disc. Thus, the cover, the tongues and the serrations combine to unexpectedly achieve the same function, all different from those described earlier i.e. that of rotor cooling, by exploiting the fact that the spacer is rotated after having been inserted between two discs so that the tongues are no longer opposite the serrations but between them and thus splitting the air flow across the serrations.

Being less mechanically stressed than the normal spacers since it serves no purpose in the assembly of other components against which it would be compressed, and the fact that the only connection to the discs is through a circular loading on a collar and an axial thrust against a seal, the spacer may be made of light construction, and even made from composite materials if the cooling is adequate.

Figure 2:
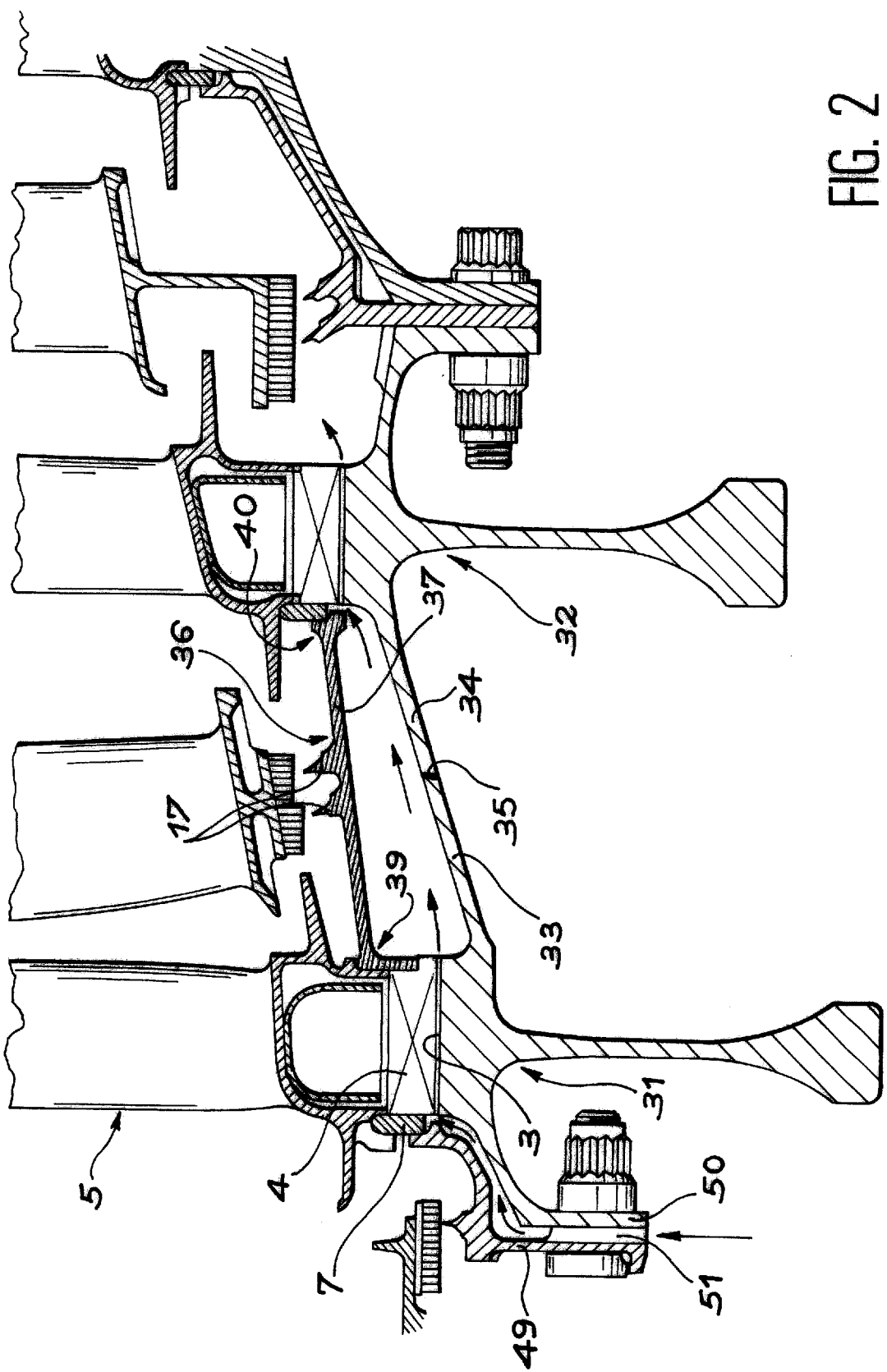
Figure 3:
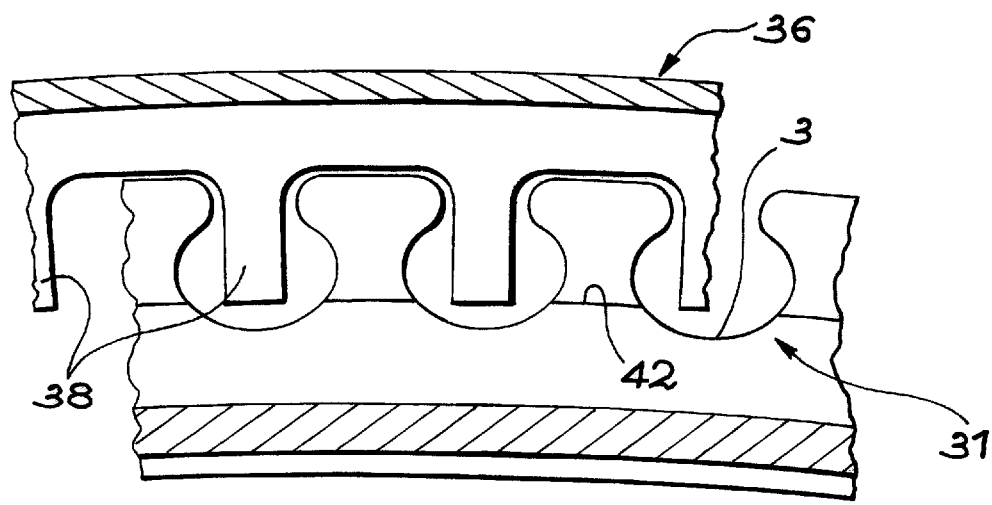
Figure 4:
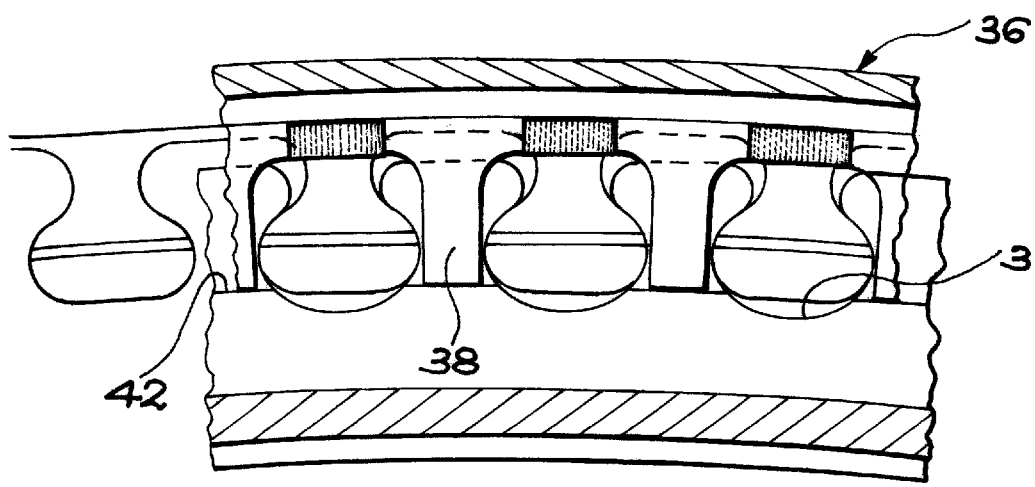
Figure 5:
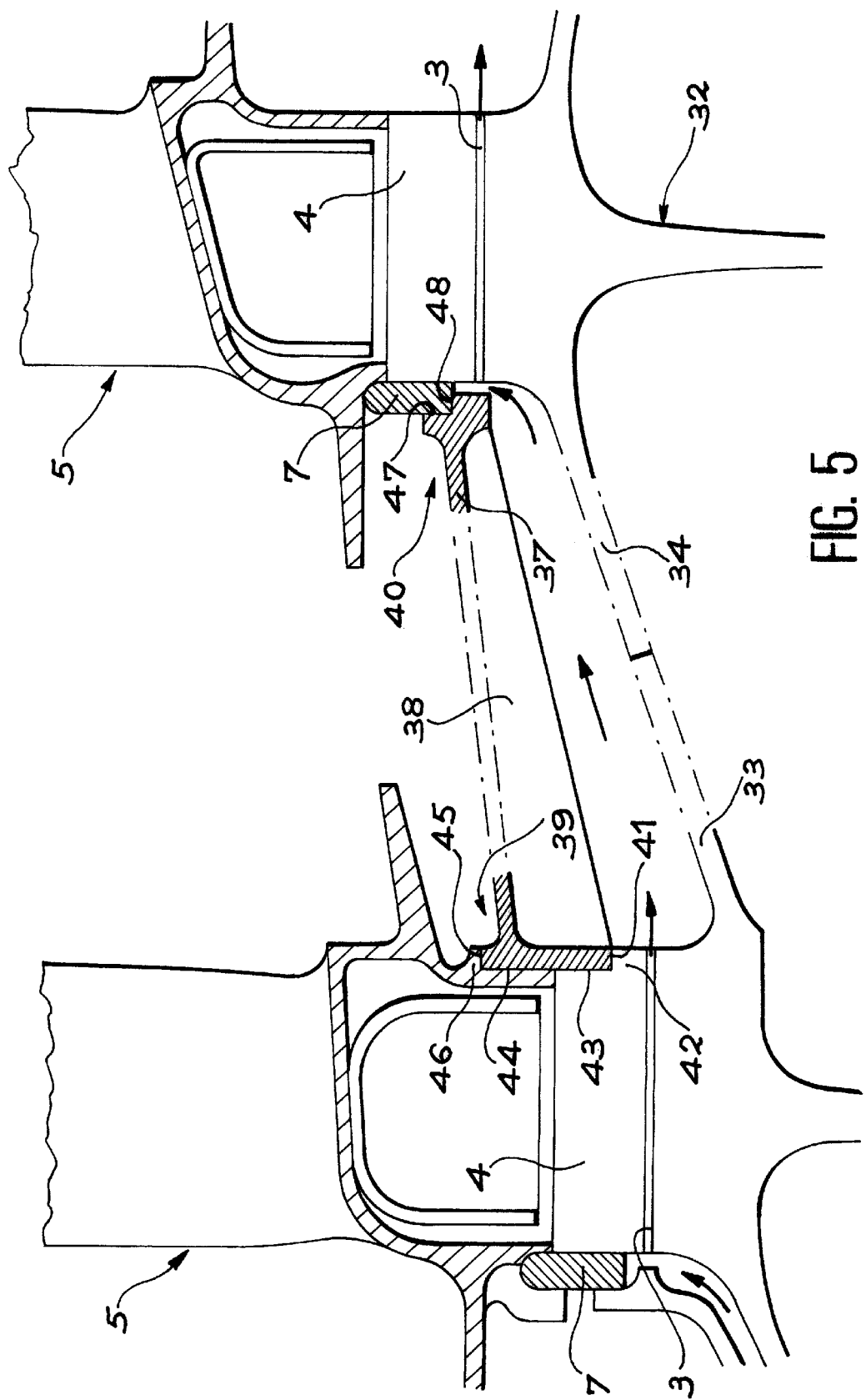

Other aspects, characteristics and benefits of the invention will become apparent when examining the following figures and the descriptions thereto:

FIG. 1 is a view of an embodiment in the form of a prior art relatively similar to the invention, FIG. 2 is a general view of a specific assembly in conformance with the invention, FIGS. 3 and 4 are two partial views of the assembly seen in an axial direction at two successive points in time, and FIG. 5 shows the extremities of the connection of the spacer to the discs.

In FIG. 1, two successive discs 1 and 2 of a rotor each comprising axial or diagonal serrations 3 in which are slotted the roots 4 of the blades 5. The roots 4 are held in place in the serrations 3 by their thickest sections and, axially, by a split seal 7 held in place in the locating lugs 8 of the blades 5 covering a part of the discs 1 or 2 it retains the blades 5 on the one hand, and on the other hand prevents motion in the opposite direction of the blades 5, that would push back against the seal 7, are stopped by a collar 9 or 10 at the edge of a spacer 11 resting between discs 1 and 2 and against which the seal 7 presses. The spacer 11 essentially comprises a cover 12 connecting the collars 9 and 10 and a flange 13 which extends to half way along the length of the cover 12 and beneath it; the flange 13 is inserted between the flanges 14 and 15 respectively and joined to the discs 1 and 2 using bolts 16. Finally, it can be seen that the cover 12 has on its outer surface a pair of tongues 17, which are circular ridges that can engage with a ring 18 made from an abradable material attached to the rim of a stage of fixed blades 19.

Discs 1 and 2 can be cooled with a gas flow originating from another part of the machine, but normally a specific assembly would require to be established for each. The flange 13 of the spacer 11 could thus be located between two pairs of bolts 16 in order to clear the half moon scallops 20 allowing cooling gas injected in a chamber 21 of the rotor to flow into an annular passage 22 running between the outer cover 12 of the spacer 11 and a connecting band joining the flange 15 to the disc 2 which butts against it and cools it before escaping to join the main flow in the machine. It is obvious that the flange 13 impedes common cooling of discs 1 and 2.

Referring to FIG. 2 in order to understand the invention, it can be seen that the discs 1 and 2 are replaced by discs 31 and 32 which are directly coupled using bands 33 and 34 welded together at a join 35. Here also the discs 31 and 32 have serrations 3 used to locate the roots 4 of the blades 5. The spacer 11 is replaced by a spacer 36 less its attachment flange and comprising in particular: an external cover 37 with a diameter always greater than that of the smallest disc 31; axial tongues 38, as can be seen in FIGS. 3 and 4, and for which the angular pitch is the same as for the serrations 3 of the disc 31 or a multiple thereof; and the extremities of the stops 39 and 40 associated respectively with the discs 31 and 32.

The first of these parts of the stop 39 comprise (refer to FIG. 5), on the tongues 38, internal thrust faces 41 on the outer faces of a collar 42 formed on the side of the disc 31, the axial thrust faces 43 butting against the disc 31, and against the cover 37, and axial stop face 44 of the blades 5, and an outer thrust face 45 located beneath the protruding lugs of the blades 5. The other parts of the stop 40 comprise an axial face 47 and an outer thrust face 48 both of which are in contact with the retaining seal 7 of the blades 5 of the disc 32. It will be seen that the tongues 38, which do not possess these two latter faces, can extend from the edge adjacent to the disc 31 as far as either the outer edge, or some intermediate part of the spacer 36, but it is preferable that they extend as far as possible in order to create the complete cooling passageways, as will be described later.

The thrust of the inner faces 41 against the crown 42 means that the spacer 36 can be centred on the rotor; the axial thrust faces 43 and 47 limit the axial movements of the spacer 36 whilst providing an adequate flexibility thanks to the pressure of the seal 7; finally, the outer radial thrusts against faces 45 and 48 are not essential, but may however contribute to the uniformity of loading of the assembly and reduce the vibrations.

The method of build entails fitting the blades 5 to disc 32 by fitting the seal 7, then sliding the spacer 36 into the other disc 31 by sliding the tongues 38 in the serrations 3, which is shown in FIG. 3; then the spacer 36 is rotated to align the tongue 38 against serrations 3 as shown in FIG. 4; it is then possible to fit the blades 5 of the disc 31 and to install them using a seal 7 that, contrary to the previous design is placed on the opposite side of the spacer 36.

The spacer 36, being less stressed thermally and mechanically than the earlier type due to the omission of the flange 13, may advantageously be manufactured from a non metallic carbon based composite material; however exceptionally the tongues 17 can continue to be manufactured in metal together with those parts adjacent to the cover 37.

The spacer 36 assists with the cooling of discs 31 and 32 using a similar system which is accomplished as follows (FIG. 2): a side plate 49 is bolted to a flange 50 of the disc 31 at the opposite side to the spacer 36 to retain the seal 7; it is provided with half moon scallops 51 for the inlet cooling air which flows between the side plate 49 and the flange 50 this air then flows through the serrations 3, beneath the blade roots 4, cooling the disc 31, before passing through passageways beneath the cover 37 in the spacer 36 between the tongues 38; then it flows without obstruction through the passages created by the tongues 38, to impinge on the disc 32 that it cools as it passes through the serrations 3 beneath the blade roots 4.

The conical shape of the cover 37, which takes the place of bolted flanges, has better mechanical strength properties and is in close proximity to the tongues 17 of the stator blades, which allows the abradable support ring 18 to be thinner. The tongues 38 provide the additional effect of stiffening the spacer 36.

What is claimed is:

1. Turbomachine rotor assembly, comprising two bladed-discs (31,32) and a spacer (36), at least one of the discs (31) being equipped with serrations (3) to house the roots (4) of the blades (5), where the spacer (36) comprises a cover (37) surrounding the serrated disc (31); tongues (38) which slot into the serrations (3); internal radial thrust faces (41) on the matching faces (42) formed on one of the discs (31), and outer axial thrust faces (43, 47), the inner radial thrust faces (41) being located on the tongues (38), characterised in that the outer axial thrust faces form the primary faces (43) that press against one of the discs, and the secondary faces (47), opposite the primary faces (43) that press against an associated seal (7) on the other side of the discs.

2. Turbomachine rotor assembly according to the claim 1, characterised by the tongues and cover forming the boundaries of the cooling passageways of the discs, the passageways also extending into the serrations (3) and beneath the roots of the blades, and where the tongues (38) extend between the serrations (3), the primary outer axial thrust faces are located on the tongues, and the matching faces (42) located on a crown formed on the side of the first disc (31).

3. Rotor assembly according to one of the particular claims 1 or 2, characterised in that the discs (31, 32) are connected by a single attachment and where the spacer (36) is circular.

4. Turbomachine rotor assembly according to claim 3, characterized in that the spacer outer radial thrust faces (45, 48) are provided on the blades of one of the discs and on the seal.

5. Turbomachine rotor assembly according to claim 3, characterized in that the spacer is a composite material, but not the sealing tongues (17) which rub against the matching abradable rings (18).

6. Turbomachine rotor assembly according to one of the particular claims 1 or 2, characterised in that the spacer outer radial thrust faces (45, 48) are provided on the blades of one of the discs and on the seal.

7. Turbomachine rotor assembly according to claim 6, characterized in that the spacer is a composite material, but not the sealing tongues (17) which rub against the matching abradable rings (18).

8. Turbomachine rotor assembly according to one of the particular claims 1 or 2 characterised in that the spacer is a composite material, but not the sealing tongues (17) which rub against the matching abradable rings (18).

* * * * *